(No Model.)
C. E. TOBEY.
TRANSPLANTER.
No. 388,321. Patented Aug. 21, 1888.
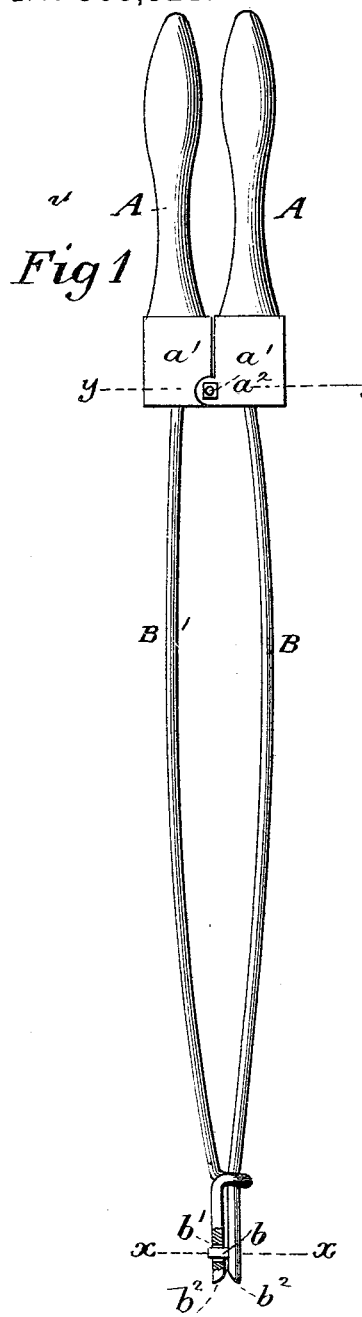
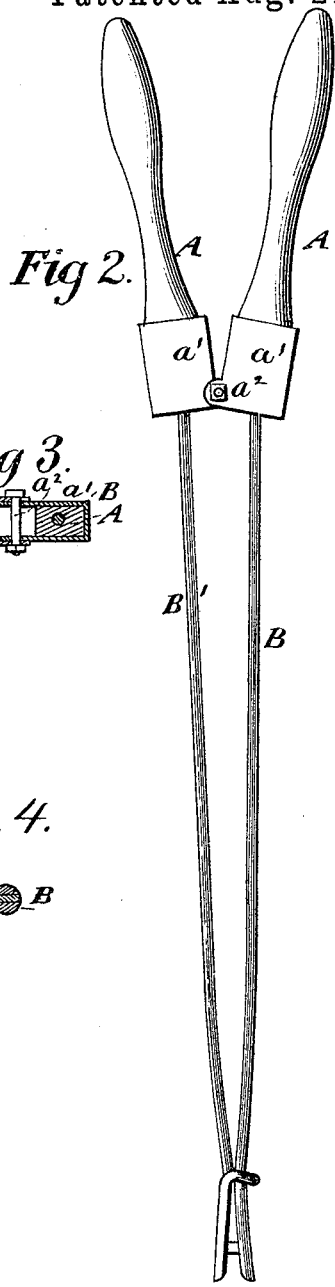
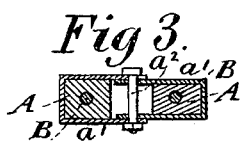
Witnesses,
A. Ruppert
G. B. Towles.
Inventor,
Corey E. Tobey
Per
Thomas P. Simpson
Atty.
N. PETERS, Photo-Lithographer, Washington, D. C.

UNITED STATES PATENT OFFICE.

COREY E. TOBEY, OF ARKADELPHIA, ARKANSAS.

TRANSPLANTER.

SPECIFICATION forming part of Letters Patent No. 388,321, dated August 21, 1888.

Application filed May 26, 1888. Serial No. 275,158. (No model.)

*To all whom it may concern:*

Be it known that I, COREY E. TOBEY, a citizen of the United States, residing at Arkadelphia, in the county of Clark and State of Arkansas, have invented certain new and useful Improvements in Transplanters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of my invention is to facilitate the planting of sweet-potato sprouts and short cuttings of the vine, the same varying in length; but it is not intended or adapted to plant cut pieces of the tuber.

Figure 1 of the drawings is a side elevation of the open tongs; Fig. 2, a similar view of the closed tongs; Fig. 3, a cross-section on dotted line $xx$ of Fig. 1, and Fig. 4 a cross-section on dotted line $yy$ of Fig. 1.

In the drawings, A represents the handles, each of which is surrounded by the plate $a$, having ears $a'$, connected by a pivot, $a^2$. In one end of these handles I make fast one end of the steel wires B B', which have the right-angled stud $b$ and slot $b'$, respectively, so as to keep the jaws $b^2 b^2$ always in the same plane, and to serve as a stop. The wire B' is bent so as to form a side loop, $b^3$, through which the wire B passes, and by which the two wires are held together.

I use my sweet-potato tongs in the following manner. I place my sprouts or vine-cuttings in a pouch slung across my shoulder and hanging at my left side, with their lower ends or roots even. I then grasp a handful of sprouts or cuttings in my left hand, so that when the hand is extended the lower ends will point upward and extend slightly above the thumb and forefinger. I then work a plant my out to the ends of thumb and forefinger and hold the tongs in my right hand. I then place the root or lower end of the plant between the jaws and grasp the handles so as to close them on the plant. I then thrust the implement into the ground, so as to leave the proper portion of the plant above the soil. Then, releasing my grasp upon the handles, I withdraw the implement from the ground. The implement when withdrawn leaves a small hole around the plant, which is closed by pressing on the soil at one side of the plant. I then repeat the operation until my pouch is exhausted.

What I claim as new and of my invention is—

Tongs for planting sweet-potato sprouts and cuttings, which consist of the handles A A, pivoted near their front ends, and the spring-wires B B', the latter made with the stud $b$, slot $b'$, jaws $b^2 b^2$, and side loop, $b^3$, substantially as shown and described.

In testimony whereof I affix my signature in presence of two witnesses.

COREY E. TOBEY.

Witnesses:
J. D. WILLIAMSON,
J. T. SCOTT.